(12) United States Patent
Laskaridis et al.

(10) Patent No.: US 12,725,017 B2
(45) Date of Patent: Sep. 1, 2026

(54) METHOD AND SYSTEM FOR IMPLEMENTING A VARIABLE ACCURACY NEURAL NETWORK

(71) Applicant: SAMSUNG ELECTRONICS CO., LTD., Suwon-si (KR)

(72) Inventors: Stefanos Laskaridis, Staines (GB); Hyeji Kim, Staines (GB); Stylianos Venieris, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 950 days.

(21) Appl. No.: 16/923,447

(22) Filed: Jul. 8, 2020

(65) Prior Publication Data

US 2021/0012194 A1 Jan. 14, 2021

(30) Foreign Application Priority Data

Jul. 11, 2019 (GR) .............................. 20190100291
Apr. 6, 2020 (GB) ...................................... 2005029
Jun. 2, 2020 (KR) ........................ 10-2020-0066486

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC G06N 3/08; G06N 3/04; G06N 3/045; G06N 3/063
USPC ........................................................... 706/19
See application file for complete search history.

(56) References Cited

U.S. PATENT DOCUMENTS

2017/0169326 A1 6/2017 Diamos et al.
2018/0129947 A1 5/2018 Cambot et al.
2018/0157966 A1 6/2018 Henry
2019/0034761 A1 1/2019 Huang et al.
2019/0180168 A1* 6/2019 Barad ...................... G06N 3/04

FOREIGN PATENT DOCUMENTS

CN 1112693 A 11/1995
CN 108549926 A 9/2018
JP 3743247 2/2006

(Continued)

OTHER PUBLICATIONS

Teerapittayanon, S., McDanel, B., & Kung, H. T. (Dec. 2016). Branchynet: Fast inference via early exiting from deep neural networks. In 2016 23rd international conference on pattern recognition (ICPR) (pp. 2464-2469). IEEE. (Year: 2016).*

(Continued)

*Primary Examiner* — Brian M Smith
(74) *Attorney, Agent, or Firm* — NIXON & VANDERHYE P.C.

(57) ABSTRACT

Disclosed is an electronic apparatus. The electronic apparatus includes a memory storing at least one instruction, and a processor coupled to the memory and configured to control the electronic apparatus, the processor configured to identify one of a plurality of exit points included in a neural network based on at least one constraint in at least one of processing or the electronic apparatus, process the input data via the neural network and obtain processing results output from the identified exit point as output data.

17 Claims, 10 Drawing Sheets

(56) References Cited

FOREIGN PATENT DOCUMENTS

| | | |
|---|---|---|
| KR | 10-2018-0062004 | 6/2018 |
| KR | 10-2018-0138441 | 12/2018 |
| KR | 10-2019-0013162 | 2/2019 |
| WO | 2018/067962 | 4/2018 |

OTHER PUBLICATIONS

Li, E., Zhou, Z., & Chen, X. (Aug. 2018). Edge intelligence: On-demand deep learning model co-inference with device-edge synergy. In Proceedings of the 2018 Workshop on Mobile Edge Communications (pp. 31-36). (Year: 2018).*

Tsai, C. H., Chih, Y. T., Wong, W. H., & Lee, C. Y. (2015). A hardware-efficient sigmoid function with adjustable precision for a neural network system. IEEE Transactions on Circuits and Systems II: Express Briefs, 62(11), (pp. 1073-1077). (Year: 2015).*

Teerapittayanon, S., McDanel, B., & Kung, H. T. (Jun. 2017). Distributed deep neural networks over the cloud, the edge and end devices. In 2017 IEEE 37th international conference on distributed computing systems (ICDCS) (pp. 328-339). IEEE. (Year: 2017).*

Peluso, Valentino, and Andrea Calimera. "Scalable-effort convnets for multilevel classification." In 2018 IEEE/ACM International Conference on Computer-Aided Design (ICCAD), pp. 1-8. IEEE, 2018. (Year: 2018).*

Yan, Z. et al., "HD-CNN: hierarchical deep convolutional neural network for large scale visual recognition," downloaded from <arxiv.org/abs/1410.0736> (May 16, 2015) pp. 4321-4329. (Year: 2015).*

S. Teerapittayanon et al. "BranchyNet: Fast inference via early exiting from deep neural networks," 23rd International Conference on Pattern Recognition (ICPR), 2016, 6 pages.

Gao Huang et al. "Multi-Scale Dense Networks for Resource Efficient Image Classification," International Conference on Learning Representations (ICLR), 2018, 14 pages.

Y. Kaya et al. "How to Stop Off-the-Shelf Deep Neural Networks from Overthinking," International Conference on Machine Learning (ICML), Oct. 16, 2018, 8 pages.

Jia Deng et al. "What Does Classifying More Than 10,000 Image Categories Tell Us?" ECCV, 2010, pp. 71-84.

Jia Deng et al. "Hedging Your Bets: Optimizing Accuracy-Specificity Trade-offs in Large Scale Visual Recognition," CVPR, 2012, pp. 1-8.

A. Bilal et al. "Do Convolutional Neural Networks Learn Class Hierarchy?" IEEE Transactions on Visualization and Computer Graphics, 24(1), Oct. 17, 2017, pp. 152-162.

Mohammed J. Saberian et al. "HD-CNN: Hierarchical Deep Convolutional Neural Networks for Large Scale Visual Recognition", ICCV, 2015, 9 pages.

Paul Viola et al. "Robust Real-Time Face Detection", IJCV, 57(2), 2004, pp. 137-154.

Nuno Vasconcelos et al. "Boosting Classifier Cascades", NIPS, 2010, 9 pages.

Zhixiang (Eddie) Xu et al. "Classifier Cascades and Trees for Minimizing Feature Evaluation Cost", Journal of Machine Learning Research (JMLR), Jun. 2014, pp. 2113-2144.

H. Li et al. "A Convolutional Neural Network Cascade for Face Detection", CVPR, 2015, 10 pgs.

Anelia Angelova et al. "Real-Time Pedestrian Detection With Deep Network Cascades", BMVC, 2015, pp. 1-12.

Ali Diba et al. "Weakly Supervised Cascaded Convolutional Networks", CVPR, 2017, 9 pgs.

Alexandros Kouris et al. "CascadeCNN: Pushing the Performance Limits of Quantisation in Convolutional Neural Networks", 2018 28$^{th}$ International Conference on Field Programmable Logic and Applications (FPL), Jul. 13, 2018, 8 pages.

Christian Szegedy et al. "Going Deeper with Convolutions", CVPR, 2015, 9 pages.

Gao Huang et al. "Densely Connected Convolutional Networks", CVPR, 2017, 9 pages.

Valentino Peluso et al. "Scalable-Effort ConvNets for Multilevel Classification" ICCAD, 2018, 8 pages.

Xin Wang et al. "SkipNet: Learning Dynamic Routing in Convolutional Networks" ECCV, 2018, 16 pages.

Zuxuan Wu et al. "BlockDrop: Dynamic Inference Paths in Residual Networks", CVPR, 2018, 10 pages.

Michael Figurnov et al. "Spatially Adaptive Computation Time for Residual Networks", CVPR, 2017, 10 pages.

Alex Graves et al. "Adaptive Computation Time for Recurrent Neural Networks", NIPS Deep Learning Symposium, Apr. 18, 2016, 19 pages.

Chuan Guo et al. "On Calibration of Modern Neural Networks", ICML, 2017, 10 pages.

Jia Deng, et al "ImageNet: A Large-Scale Hierarchical Image Database", 2009 IEEE Conference on Computer Vision and Pattern Recognition, 2009, pp. 248-255.

Search Report and Written Opinion issued Oct. 7, 2020 in counterpart International Patent Application No. PCT/KR2020/008980.

Li, En et al., "Edge Intelligence: On-Demand Deep Learning Model Co-Inference with Device-Edge Synergy," arXiv:1806.0784v4, Dec. 27, 2018, pp. 1-10[retrieved on Sep. 25, 2020].

Cambazoglu, B. Barla, et al., "Early Exit Optimizations for Additive Machine Learned Ranking Systems," Proceedings of the third ACM international conference on Web search and data mining (WSCM), Feb. 6, 2010 pp. 411-420.

Extended Search Report and Written Opinion dated Apr. 25, 2022 issued in counterpart European Patent Application No. 20836673.2.

Search and Examination Report issued Dec. 17, 2020 in corresponding United Kingdom Patent Application No. 2005029.0.

Teerapittayanon Surat et al, "Distributed Deep Neural Networks Over the Cloud, the Edge and End Devices", Proceedings of the International Conference On Distributed Computing Systems, 2017, IEEE, pp. 328-339.

Chinese Office Action dated Oct. 30, 2024 for CN Application No. 202080051012.0.

Office Action for CN Application No. 202080051012.0 dated Jun. 26, 2025 and English translation, 17 pages.

Office Action for EP Application No. 20836673.2 dated Jul. 1, 2025, 12 pages.

Amir R. Zamir et al, "Feedback Networks" 2017 IEEE Conference on Computer Vision and Pattern Recognition, Jul. 21, 2017, pp. 1808-1817.

Chinese Office Action dated Mar. 12, 2025 for CN Application No. 202080051012.0.

* cited by examiner

METHOD AND SYSTEM FOR IMPLEMENTING A VARIABLE ACCURACY NEURAL NETWORK

CROSS-REFERENCE TO RELATED APPLICATIONS

This application is based on and claims priority under 35 U.S.C. § 119 to Greek Patent Application No. 20190100291, filed Jul. 11, 2019, in the Hellenic Industrial Property Organization, British Patent Application No. 2005029, filed Apr. 6, 2020 in the UK Intellectual Property Office, and Korean Patent Application No. 10-2020-0066486, filed Jun. 2, 2020, in the Korean Intellectual Property Office, the disclosures of which are incorporated by reference herein in their entireties.

BACKGROUND

1. Field

The disclosure relates to a method and system for implementing a variable accuracy neural network, and for example to a method for outputting a result from a neural network depending on classification difficulty, and accuracy and latency requirements.

2. Description of Related Art

To deal with artificial intelligence (AI) tasks of increasing complexity, deep neural networks (DNNs) have become deeper and wider, but this in turn has resulted in a significant increase in the processing and memory requirements to implement the DNNs. Often, DNNs are deployed on resource-constrained systems or devices, such as smartphones or other portable computing devices and embedded platforms, and therefore, the required processing, memory and/or energy capability to implement the DNNs may not be available.

Currently, two methods for implementing DNNs on resource-constrained systems and devices will be described.

1. Efficient DNN inference: given an input sample, the system aims to minimize the amount of computation to yield a correct output.

2. Latency-constrained DNN inference: given a specific resource budget/latency constraint, the system aims to produce the most accurate prediction possible.

The two options may require using hand-crafted design of lightweight architectures (e.g. MobileNet, SqueezeNet, ShuffleNet, etc.), which reduce the computation/processing requirements by reducing accuracy, or using compression techniques such as network distillation, quantization and low-rank approximation. Despite the reduction in complexity, as each input sample must go through the whole network, the two methods have a common drawback in terms of resulting in the same latency regardless of the complexity of the input sample. This is inefficient because some input samples are inherently easier to process using the DNN (e.g. to classify) than others.

An alternative approach that aims to exploit the difference in input sample classification difficulty across inputs is the use of early exits. With this approach, easy-to-classify inputs may exit the DNN earlier through early-exit classifiers, such that only the more challenging samples may be processed by the full DNN. In this manner, the network provides a progressively refined accuracy as a function of computation time. The idea of early exits has been explored by several researchers, such as: S. Teerapittayanon et al ("BranchyNet: Fast inference via early exiting from deep neural networks," In 23rd International Conference on Pattern Recognition (ICPR), 2016); Gao Huang et al ("Multi-Scale Dense Networks for Resource Efficient Image Classification," In International Conference on Learning Representations (ICLR), 2018); and Y. Kaya et al ("How to Stop Off-the-Shelf Deep Neural Networks from Overthinking," In International Conference on Machine Learning (ICML), 2019). However, significant challenges exist to implement early exits.

1. Scalability: So far, existing early-exit method have only been evaluated on small datasets and have not demonstrated scaling on more complex domains. For example, S. Teerapittayanon et al and Y. Kaya et al do not present results using a large-scale dataset such as ImageNet (L. Fei-Fei et al ("ImageNet: Constructing a Large-Scale Image Database," Journal of Vision, 9(8):1037-1037, 2010)), while the disclosures of Gao Huang et al have not been applied on larger-than-ImageNet datasets (see e.g. Jia Deng et al ("What Does Classifying More Than 10,000 Image Categories Tell Us?," In ECCV, 2010)).

2. Performance vs. conventional methods: The conventional early-exit methods have not managed to exhibit competitive performance compared to other compression techniques, such as distillation, quantization and low-rank approximation.

3. Low accuracy under stringent latency constraints: In scenarios with tight latency constraints or limited resource budget, outputting from an early exit is the only option to obtain a result. An inherent limitation of existing early-exit methods is that the accuracy of early classifiers is low for hard-to-classify samples and hence, the overall achieved accuracy is severely degraded when the latency constraints are high.

Accordingly, there is a need to develop an improved neural network architecture suitable for implementation on devices and resource-constrained systems.

SUMMARY

Embodiments of the disclosure provide an electronic apparatus capable of neural network computation capable of progressive processing and providing scalability and a method for controlling thereof.

In an example embodiment of the present disclosure, a method for implementing a variable accuracy neural network on an apparatus is provided, the method comprising: receiving an input to be processed by the neural network; determining at least one requirement to be satisfied based on processing the input using the neural network; selecting an exit point in the neural network based on the at least one requirement; processing the input using the neural network up to the selected exit point in the neural network; and outputting a processing result from the selected exit point in the neural network.

A problem in existing early-exit architectures is the placement of early exits. Existing architectures manually select the position of early exits in the network with hand-crafted arbitrary strategies. However, this approach affects both the attainable latency and accuracy, as intermediate classifiers or exit points both add computing overhead and affect the training of shared weights.

Another problem of existing techniques is that, when operating under a latency budget—and hence propagation to the rest of the net is prohibited—the early classifiers of existing methods have substantially degraded accuracy. It is necessary to improve the accuracy of early classifiers to meet both the accuracy and latency requirements of the target low-latency application and not degrade the Quality of Experience (QoE) of the end user.

In another setting, when early exiting is performed based on prediction confidence, the low confidence of intermediate classifiers in existing methods leads to samples unnecessarily propagating through the rest of the network. In turn, this leads to latency, deterioration of power consumption and overall QoE. Therefore, there is a need for improving the confidence of early classifiers so that no unnecessary computation is performed by the network.

Current visual classification research is focusing on beating the state-of-the-art on benchmark datasets with a limited number of classes. However, in real-world scenarios the number of classes can easily surpass several thousands, a fact which renders many current techniques insufficient. The conventional early-exist techniques have not been applied on large-scale domains. In this context, the scalability to thousands of classes may be a problem.

When deploying such models in production, there is a significant "preparation" cost for different target devices, e.g., different variants of the same network have to be trained from scratch to deploy on mid-tier and high-end devices. The problem in this case is how to execute a single training process for a single network and still be able to target devices with diverse capabilities.

Embodiments of disclosure provide neural network computation that is incremental and dynamic. For example, embodiments of the present disclosure may perform a trade-off between how early you exit a neural network and the accuracy of the processing result. This trade-off may also enable neural network computation to be performed on devices with constrained resources, such as mid-tier smartphones. For example, if the minimum level of accuracy or confidence for the processing result is set (e.g., 80% confidence instead of 100%), the input to be analyzed or processed by the neural network may be early terminated without being processed by the whole neural network. That is, a processing result can be output from an intermediate classifier or stage (e.g., an exit point, output point, early exit point, or early output point) within the neural network, and this processing result may satisfy the required confidence level. This may advantageously enable a processing result to be obtained more quickly than if the input had to be processed by the whole of the neural network, which is useful for low-latency or time-critical applications. The processing result output by an early exit point may have a comparatively lower accuracy than a processing result output by the final exit point/classifier of a neural network.

For example, in the context of image analysis performed on an image containing a dog, a coarse processing result may classify the image as "an animal" (very coarse) or "a dog" (less coarse), whereas a fine processing result may identify the specific breed of dog. However, in some applications, a result having a comparatively lower accuracy may be suitable. Furthermore, if a larger time budget is allowed, the coarse processing result may be further refined by continuing the processing with at least a portion of the remainder of the neural network. That is, if further refinement of the processing result, advantageously the processing continues from the exit point onwards, rather than starting again. Furthermore, the neural network can be calibrated and optimized for the apparatus/device on which it is implemented, to suit, for example, the resources and specifications of the apparatus. Thus, an apparatus that is resource-constrained, such as a smartphone or Internet of Things (IoT) device, can run a modified version of the neural network (which, for example, has fewer classes or is a part of the full neural network), or can use early exits to output processing results having a comparatively lower accuracy. In this way, the resources of the apparatus are not fully used to implement the neural network, which may enable the apparatus to continue executing or running other processes or functions at the same time.

Embodiments of the disclosure address the existing limitations of progressive inference architectures by (i) exploiting the hierarchical structure of the target domain together with (ii) a distillation-based training procedure. Embodiments of the disclosure may include 1) a hierarchy exploitation method, 2) a placement of early exits along the network in consideration of latency and accuracy and 3) a novel training scheme for jointly training all classifiers via knowledge distillation.

Exploiting hierarchy. To alleviate the typical low confidence of early-exit classifiers, which can easily process inputs propagating through the network with an unnecessary overhead, the present disclosure employ classifiers (or early exits/exit points) that operate on a coarser-grained domain. Human understanding of the world is hierarchical. For example, humans understand that "poodle" belongs to the class of "dog", and "dog" belongs to the class of "animals", or that "cheese" belongs to the class of "dairy", and "dairy" belongs to the class of "food". Embodiments of the disclosure may incorporate this hierarchy information to the classification models of the neural network to get progressively more precise results during inference the further into the neural network you go. As mentioned above, a neural network may be divided into at least two domains, such as a coarse-grained domain and a fine-grained domain. Classifiers of the coarse-grained domain may output results which are coarser (e.g. "animal" or "dog") than those output by classifiers of the fine-grained domain (e.g. "poodle"). That is, classifiers may be hierarchical, where classifiers nearer the start of a neural network classify images into coarse classes using basic features extracted from an image, while classifiers that are deeper in the neural network may perform finer discrimination. In such a setup, a network with N classifiers (e.g., N−1 intermediate, plus the final output) may include Ncoarse followed by Nfine exits, each one generating predictions in the corresponding domain (where N=Ncoarse+Nfine). Following this approach, coarse-grained early exits may produce predictions with higher confidence than their fine-grained counterparts, leading to lower latency for easy-to-classify samples. Moreover, the hierarchy-aware design of the network enables the support of large-scale problems with thousands of classes by allowing for more than two granularity domains. The hierarchy of the network may be extracted/determined by a number of different techniques, such as clustering (e.g., combining together) labels or features identified by other networks. The hierarchy extraction mechanism used herein is a tunable module that is selected to suit the target task.

Placement of early exits. To set up early exits, three parameters may be used: (a) the number of early exits, (b) the placement of each exit in the network and (c) the point of switching between the coarse- and fine-grained domain. As mentioned above, the conventional techniques position the early exits based on manually-picked layers. However, embodiments of the disclosure may position exits along the network by balancing the latency it takes for an input sample to reach each exit, and/or may select the switching point between the coarse- and fine-grained domain by analyzing the impact of the switching point's position on the accuracy of the final classifier at the output of the network. Another technique for positioning the exits is to consider the floating-point operations per second (FLOPS) required to reach each stage of a neural network, and to place the early exits accordingly. However, FLOPS may not be indicative of latency, as different devices may exhibit a different runtime to implement the same number of FLOPS.

Joint training via distillation. After introducing multiple early exits, each output may be taken into account in the final loss function in order to jointly optimize all parts of the network. To this end, the embodiments of the disclosure may employ the weighted sum method, where the weights sum of the losses of all classifiers is optimized. To further increase the accuracy of early classifiers (i.e. early exits), the present disclosure employs distillation as a mechanism of transferring knowledge from the end layer to intermediate classifiers. For example, the final classifier is used as the teacher that distills knowledge to the classifiers at the early exits. In this manner, the output of the softmax layer of the final classifier is used as a soft target when calculating the loss of intermediate classifiers, instead of using the ground-truth labels as hard targets.

Thus, selecting an exit point in the neural network may comprise selecting one of a plurality of exit points that are equidistantly-spaced through the neural network. Selecting an exit point in the neural network may comprise selecting one of a plurality of exit points that are positioned within the neural network to balance a time taken to reach each exit point and accuracy. Selecting an exit point in the neural network may comprise selecting one of a plurality of exit points that are positioned in a coarse-grained domain or in a fine-grained domain of the neural network. Selecting an exit point in the neural network may comprise selecting one of a plurality of classifiers in the neural network.

The method may further comprise: receiving information on at least one of: a computational load of the apparatus, a memory capacity of the apparatus, and power consumption of the apparatus; wherein selecting an exit point in the neural network comprises selecting an exit point based on the at least one requirement and the received information. Thus, the resource capacity or specifications of the apparatus may be taken into account when selecting the exit point. For example, if the apparatus has a low processing capacity, or if the apparatus' processing capacity is being used simultaneously to implement the neural network and implement/execute other processes/functions, then an earlier exit point may be selected than if the apparatus has a large processing capacity or is not being used to execute other functions at the same time. This advantageously avoids latency problems that may arise when the processor(s) of the apparatus are simultaneously performing multiple tasks or when the apparatus does not have the processing capacity to implement the full neural network. Thus, instead of waiting a long time for the neural network to fully process an input, an early exit can be selected and time delay may be reduced accordingly. Thus, embodiments of the present disclosure may use the apparatus specifications or current usage of the apparatus' resources to select a suitable exit point.

The step of determining at least one requirement may comprise determining a required confidence level to be satisfied when processing the input by the neural network. That is, given the required confidence of the processing result, as calculated by a softmax layer distribution of each classifier, an appropriate exit point may be selected at which to output the processing result. For example, if an input is considered difficult to classify/analyze, a lower confidence may be inevitable. By moving to a coarse-grained classification domain, the problem may become easier because fewer—and more general—categories or classes exist in the coarser domain and therefore, there are fewer classification options and so the classification confidence may be higher. Similarly, if an input is considered easy to classify/analyze, then the original confidence should be high enough to exit in the original, fine-grained classification domain. In any case, if the processing result does not have the required confidence or is considered to be inaccurate or incorrect, the processing of the input may continue from that exit point onwards in order to improve the processing result (i.e. without restarting the processing from the beginning of the neural network).

The method may comprise: comparing, a confidence associated with the processing result generated using the selected exit point of the neural network with a required confidence; and outputting, based on the confidence associated with the processing result being greater than or equal to the required confidence, the processing result generated by the selected exit point. If the required confidence has not be satisfied, the method may comprise: continuing the processing result beyond the selected exit point in the neural network, based on the confidence associated with processing result generated using the selected exit point being less than the required confidence.

Embodiments of the disclosure may be integrated with cameras/image capture devices, to optimize the performance of the cameras. For example, the present disclosure may be integrated with Samsung's Bixby camera scene optimizer. For example, Bixby performs inference over the incoming frames of a camera application on a smartphone (prior to the user pressing a button on the application to capture an image), with the goal of recognizing the scene or object in the incoming frames. Bixby performs scene/object prediction to tune and selectively enhance the image to obtain the highest quality result for the type of scene/object that is predicted to be contained in the incoming frames. Furthermore, Bixby can adjust settings of the camera, such as the shutter speed, ISO, or aperture selection, in the latest smartphone models. If the object being viewed by a camera moves quickly, or the user just wants a quick shot, conventional methods to make suitable adjustments to the camera make a user wait for the whole neural network inference to complete in order to classify the scene/object and tune the image or camera settings. On the other hand, embodiments of the present disclosure may provide incremental and dynamic computation, where the end result of the scene optimizer can be further refined if a larger time budget is allowed. Furthermore, given a latency constraint, a meaningful output can be extracted before the completion of the whole network by means of the early-exit classifiers.

Embodiments of the disclosure could be used to select an exit point in the neural network based on a mode that an application, such as a camera application on a smartphone, may be operating in. For example, with reference to the Bixby camera scene optimizer, the present disclosure may operate under two modes based on the type of scene to be captured by the camera. Accordingly, the step of determining at least one requirement may comprise receiving a mode selection, each mode specifying at least one requirement. Receiving a mode selection may comprise, for example, receiving one of: a low-latency mode, and a confidence-based mode.

In the context of a camera, in the low-latency mode, there is a limited latency budget to yield a prediction for the target scene. This scenario is evident in cases where the user wants to shoot fast-changing scenes, such as moving objects. In this context, the scene optimizer has to classify the target scene at the lowest latency possible so that the desired picture is captured with high quality. In this mode, the network is allowed to execute up to the intermediate classifier that does not compromise latency. In the existing methods, delay occurs until the whole network is completed before tuning the image, or, in the case of early exiting, accuracies are degraded. In contrast, the present disclosure substantially improve the accuracies of early classifiers and enable the low-latency shooting of optimized pictures.

Thus, when a low-latency mode selection is received, selecting an exit point in the neural network may comprise selecting an exit mode that can be reached within a time limit specified by the low-latency mode.

In the context of a camera, in the confidence-based mode, the mode is to perform as few computations as needed to obtain an accurate classification. This scenario is clear in cases where the target scene is almost constant, such as landscapes. In this context, the scene optimizer yields a scene prediction by exiting at the first classifier with sufficient confidence. However, execution is not restricted by latency, and therefore, as the computation is incremental and dynamic, the end result can be further refined if a larger time budget is allowed. Existing methods demonstrate low confidence at their early-stage classifiers. The present disclosure improve the confidence of all classifiers (exit points) in the neural network by means of its progressive hierarchical inference technique.

Thus, when a confidence-based mode selection is received, selecting an exit point in the neural network may comprise selecting the first exit point which provides a processing result with a confidence level specified by the confidence-based mode. The method may further comprise: receiving a request to further refine the processing result; processing the input using at least part of a remaining portion of the neural network; and outputting a further processing result from the neural network.

As mentioned above, embodiments of the present disclosure provide a neural network model that can be implemented on any type of device, as the neural network can be calibrated or tuned to suit the specifications or resources of any device. Thus, a single neural network model can be provided to a wide range of devices, where simple calibration techniques can be used to adjust the model to suit each device. Thus, the method may further comprise: receiving the neural network to be implemented on the apparatus; and calibrating the neural network based on at least one specification of the apparatus, the at least one specification comprising at least one of: a processing capacity of the apparatus, a memory of the apparatus, or a power capacity of the apparatus.

Calibrating the neural network for implementation on an apparatus may comprise reducing a number of classes used to process the input and output a processing result. By reducing the number of classes available, the number of possible outputs of the neural network is reduced, which reduces the amount of processing required and/or speeds up the processing.

In the case of mid-tier devices such as smartphones, the device may not have the suitable processing power to execute the whole neural network. The present disclosure enable the partitioning of the neural network into a head and tail, hosted by the device and a remote server (e.g. a cloud server) respectively. Existing solutions typically employ cascade configurations, where a lightweight model is run on the device and a larger model is run on the cloud. In the existing solutions, when an input is identified as misclassified by the on device model, it is sent to the cloud for re-computation. An advantage of various example embodiments of the present disclosure over the conventional approach is that the on-device computation is shared between the device and a cloud server. Thus, in the case of a misclassified input, instead of starting inference from scratch on the cloud, the output of the on-device computation is reused and refined by the cloud-hosted part of the neural network. Overall, this approach enables the acceleration of inference and hence improves the latency experienced by users of mid-tier devices.

Thus, calibrating the neural network comprises: dividing the neural network into a first portion to be executed by the apparatus, and a second portion to be executed by a remote server; wherein processing the input using the neural network comprises processing the input using the first portion of the neural network. The method may further comprise: comparing a confidence associated with the processing result generated using the first portion of the neural network with a required confidence; and outputting, based on the confidence associated with the processing result being greater than or equal to the required confidence, the processing result generated using the first portion of the neural network. If the confidence associated with the processing result generated using the first portion of the neural network is less than the required confidence, the method may comprise: transmitting the processing result to the remote server for further processing by the second portion of the neural network. The processing result generated by the second portion of the neural network may be output at the outputting step. More generally, if a classifier at an early exit generates a processing result that does not match or exceed a required confidence (which may be specified in a service level agreement, for example), then the processing may perform calculation using more of the network in order to obtain a result with a higher confidence. In cases where the network is distributed, this further processing may require using the portion of the network which has been offloaded to the remote server. For example, a classifier may identify a number of possible labels for an image, each with an associated confidence. A processing result confidence of 70% or more may be required, for example. If a classifier identifies a single label that has a confidence level of, for example, 80%, then a processing result may be output at the output point. However, if, for example, two labels are identified by a classifier, each having a confidence level of 40%, then there are multiple possibilities for how to classify the image. In this case, the processing may be performed using more of the network in order to obtain a processing result with a required confidence.

The level of accuracy a client has for a specific set of data may be determined. In this case, the method may comprise comparing the processing result generated using the first portion of the neural network (or more generally, any early exit classifier), and the final classifier of the full network. The final classifier may be considered the "oracle", such that the final label output by the final classifier is considered correct. If there is a discrepancy, or too much of a discrepancy between the processing result and the final result of the final classifier, the processing result may be considered to comprise an error in accuracy.

In large-scale cloud services, such as cloud-based image understanding, service providers have to cope with processing user-specific queries from a large pool of users. In this scenario, high processing rate (throughput) is required to comply with the service-level agreement (SLA) of users, while there is a need to keep the latency experienced by a large percentile of users to a minimum. In confidence-based progressive inference, the confidence level is used as the primary criterion for a sample to take a network exit. In this respect, the improved confidence level that the present disclosure achieve in the early exits leads to a large number of inputs exiting earlier in the network, achieving in this way lower latency for a large percentile than previously possible with conventional methods, and in turn enhancing the overall system's throughput. As a result, embodiments of the present disclosure may directly benefit largescale services that face an excessive number of users by substantially improving the quality of experience (QoE). As mentioned above, embodiments of the present disclosure may be based around a tradeoff between accuracy and latency. To achieve the low latency required for large-scale deep neural network driven cloud services, embodiments of the present disclosure may provide a neural network which is designed such that earlier exits (in the coarse-grained domain) have a higher accuracy or confidence level. Thus, the improved confidence level of the progressive hierarchical inference neural network may result in a large number of inputs can exit earlier in the network, thereby providing lower latency for a large number of users compared to a conventional network. As a result, the system experiences lower processing load and improved, higher speeds (lower latency).

Thus, determining at least one requirement may comprise receiving a service-level agreement specifying at least one requirement.

Embodiments of the disclosure may further provide a non-transitory computer readable recording medium having recorded thereon processor control code to implement the methods described herein.

As will be appreciated by one skilled in the art, the present disclosure may be embodied as a system, method or computer program product. Accordingly, embodiments of the present disclosure may take the form of a hardware embodiment, a software embodiment, or combining combination of software and hardware.

Furthermore, the present disclosure may embodied as a computer program product embodied in a computer readable recording medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present disclosure may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high level compiled or interpreted language constructs.

Embodiments of the present disclosure may also provide a non-transitory computer readable recording medium having recorded thereon code which, when implemented on a processor, causes the processor to carry out any of the methods described herein.

The disclosure further provides processor control code to implement the above-described methods, for example on a general purpose computer system or on a digital signal processor (DSP). The disclosure also provides a recording medium carrying processor control code to, when running, implement any of the above methods, in particular on a non-transitory data carrier. The code may be provided on a carrier such as a disk, a microprocessor, CD- or DVDROM, programmed memory such as non-volatile memory (e.g. Flash) or read-only memory (firmware), or on a data carrier such as an optical or electrical signal carrier. Code (and/or data) to implement embodiments of the disclosure described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The foregoing may comprise a controller which includes a microprocessor, working memory and program memory coupled to one or more of the components of the system.

It will also be clear to one of skill in the art that all or part of a logical method according to embodiments of the present disclosure may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present disclosure may be realized in the form of a recording medium having functional data thereon, said functional data comprising functional computer data structures to, when loaded into a computer system or network and operated upon thereby, enable said computer system to perform all the steps of the above-described method.

In an embodiment of the present disclosure, an apparatus for implementing a variable accuracy neural network on an apparatus is provided, the apparatus comprising: at least one processor coupled to memory and configured to control the apparatus to: receive an input to be processed by a neural network; determine at least one requirement to be satisfied based on processing the input using the neural network; select an exit point in the neural network based on the at least one requirement; process the input using the neural network up to the selected exit point in the neural network; and output a processing result from the selected exit point in the neural network.

In an embodiment of the present disclosure, a system for implementing a variable accuracy neural network on an apparatus is provided, the system comprising: a remote server; and an apparatus comprising at least one processor coupled to memory and configured to control the apparatus to: receive a neural network to be implemented on the apparatus; divide the neural network into a first portion to be executed by the apparatus, and a second portion to be executed by the remote server; receive an input to be processed by the neural network; determine at least one requirement to be satisfied when processing the input using the neural network; select an exit point in a first portion of the neural network based on the at least one requirement;

process the input using the first portion of the neural network up to the selected exit point in the first portion of the neural network; and output a processing result from the selected exit point in the first portion of the neural network.

In various example embodiments, the apparatus may, prior to outputting a processing result, compare a confidence associated with the processing result generated using the first portion of the neural network with a required confidence. If the confidence associated with the processing result is greater than or equal to the required confidence, the apparatus may output the processing result. However, if the confidence associated with the processing result is lower than the required result, the apparatus may not output a processing result from the selected exit point in the first portion of the neural network. Instead, the apparatus may continue processing the input using the first portion of the neural network until a result with the required confidence is reached. If no further exit points exist in the first portion, or if the exit points in the first portion do not generate a processing result with the required confidence, the at least one processor may transmit the processing result to the remote server for further processing by the second portion of the neural network.

In various example embodiments, the apparatus may comprise an image capture device.

In various example embodiments, the apparatus may be any one of: a smartphone, tablet, laptop, computer or computing device, virtual assistant device, a vehicle, a drone, an autonomous vehicle, a robot or robotic device, image capture system or device, an augmented reality system or device, a virtual reality system or device, a gaming system, an Internet of Things device, or a smart consumer device. This is merely an example and the disclosure may be applied to various devices.

According to various example embodiments, the electronic apparatus may secure confidence if though a processing is terminated through the early exits, and may continue additional calculations and there is an effect of improving confidence and enabling progressive processing.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
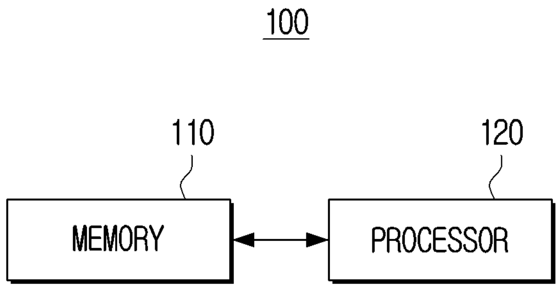
FIG. 1A is a block diagram illustrating an example configuration of an electronic apparatus according to an embodiment of the present disclosure.

The various example embodiments of the present disclosure may be diversely modified. Accordingly, various example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they would obscure the disclosure with unnecessary detail.

Broadly speaking, the present disclosure provides methods and systems for implementing a variable accuracy neural network. For example, the present disclosure provides neural network computation that is incremental and dynamic, where a single neural network can be deployed on devices with different characteristics/resource capabilities. When deploying such models in production, there is may be a significant "preparation" cost for different target devices of varying capabilities, e.g., different variants of the same network have to be trained from scratch to deploy on mid-tier and high-end devices. The problem in this case is how to execute a single training process for a single network and still be able to target devices with diverse capabilities. The present disclosure addresses the significant overhead of handcrafting different network variants and tuning the corresponding hyperparameters. Instead, the present techniques provide a single trained multi-exit network, which can, among other things, be 1) fully mapped on-device on top-tier platforms, 2) have part of the network run on-device based on the available resources of a mid-tier platform or 3) split the network in two parts, with the first part run on-device and the second on the cloud.

Hierarchy-aware inference. Several attempts have been made to exploit information from a domain-specific hierarchy in classification tasks. For example, some existing techniques set foundations for scaling algorithms to tens of thousands of labels. Their contribution focuses on creating a hierarchy-aware cost function that penalizes error based on the WordNet distance between the target and the label. Subsequent work tries to find a balance between specificity and correctness of the predicted label in SVM-based classifiers.

From an interpretability perspective, some techniques analyze the structure of class confusion of convolutional networks and supports that their learning process is deeply hierarchical. Moreover, they propose a hierarchy-aware CNN model based on AlexNet, which incorporates intermediate outputs at different granularities, based on clustering of classes from the confusion matrix of the original model. The applicability of these techniques on more complex models is to be shown.

Cascade Classifiers. Another class of algorithms that aim to reduce the computation per inference based on the difficulty of each incoming sample are DNN-based cascade systems. A cascade of classifiers is typically organized as a multi-stage architecture. Depending on the prediction confidence, the input either exits at the current stage or is passed to the next stage. In contrast to the majority of cascade systems, the present disclosure enable the refinement of a prediction without wasting already-performed computations by sharing subnetworks among classifiers. Furthermore, with the proposed method requiring a single training run to obtain the resulting network, the overhead associated with the resource, time and hyperparameter tuning of training the multiple models of cascade systems is avoided.

Early-exit networks. One of the first efforts in using early exits was GoogLeNet, where auxiliary classifiers were introduced to boost the network's final accuracy and alleviate the vanishing gradient problem. Nevertheless, these intermediate classifiers were not used during inference. BranchyNet is another architecture with intermediary outputs "branching" out of the main graph. While the technique is applicable to various network architectures, it was only evaluated on small models (LeNet, AlexNet, ResNet-110) and datasets (MNIST, CIFAR10).

MSDNet builds upon DenseNet where each layer works on multiple scales. Thus, for each layer, the network maintains multiple filter sizes of diminishing spatial dimensions, but growing depth. These variations make the network more robust to placing intermediate classifiers. However, all the output labels are in the same domain and scaling beyond ImageNet's 1K classes can be difficult.

Other input-aware inference approaches. Other methods for scalable computation include utilising different precision for easy and hard examples, or skipping intermediate layers based on decisions made by a Reinforcement Learning (RL) controller. BlockDrop introduces a stochastic technique similar to Dropout that limits information sharing between nodes, based on some learnt clustering. Thus, the model architecture and parameter values are learned at training time. SACT builds on Adaptive Computation Time (ACT) of Recurrent Neural Networks and proposes a spatial variant of Residual Networks where computation is terminated based on a computed halting score.

The present disclosure addresses the problem of incremental progressive inference in neural networks used in vision tasks. This problem is particularly significant for embedded and mobile systems, which have constraints in processing power and energy budget.

Existing methods for such scenarios include lightweight models and conventional compression techniques, both of which provide constant latency, irrespective of the difficulty of the input. In this manner, unnecessary computation is performed, leading to unnecessary resource and power consumption, and stringent latency constraints cannot be met. The present disclosure employs a different and novel approach to achieve efficient inference following the early-exit paradigm.

The present disclosure provides a method for implementing a variable accuracy neural network on an apparatus, the method comprising: receiving an input to be processed by the neural network; determining at least one requirement to be satisfied when processing the input using the neural network; selecting an exit point in the neural network based on the at least one requirement; processing the input using the neural network up to the selected exit point in the neural network; and outputting a processing result from the selected exit point in the neural network. Embodiments of the present disclosure are described in greater detail below with reference to the Figures.

FIG. 1A is a block diagram illustrating an example configuration of an electronic apparatus according to an embodiment of the disclosure.

According to FIG. 1A, the electronic apparatus 100 includes a memory 110 and a processor (e.g., including processing circuitry) 120.

The memory 110 may be implemented as an internal memory such as a read-only memory (ROM) (for example, electrically erasable programmable read-only memory (EEPROM)) and a random-access memory (RAM) or a memory separate from the processor 120. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

At least one instruction for controlling the electronic apparatus 100 may be stored in the memory 110. Information on the neural network may be stored in the memory 110.

The neural network may include a plurality of exit points (output points). For example, the neural network may output an output of each of the plurality of layers through an exit point. The plurality of exit points may, for example, be equidistantly spaced within the neural network. The plurality of exit points may be located in a coarse-grained domain or a fine-grained domain of the neural network. A classifier may also be included in each of the plurality of exit points.

The processor 120 may include various processing circuitry and control overall operations of the electronic apparatus 100.

The processor 120 may be implemented, for example, and without limitation, with at least one of a digital signal processor (DSP), a microprocessor, a dedicated processor, a time controller (TCON), a central processing unit (CPU), a micro controller unit (MCU), a micro processing unit (MPU), a controller, an application processor (AP), a communication processor (CP), an advanced reduced instruction set computing (RISC) machine (ARM) processor, or the like, or may be defined as a corresponding term. The processor 110, 210 may be implemented in a system on chip (SoC) type or a large scale integration (LSI) type in which a processing algorithm is built therein or in a field programmable gate array (FPGA) type. The processor 120 may perform various functions by executing computer executable instructions stored in the memory.

The processor 120 may control overall operations of the electronic apparatus 100 using various programs stored in the memory 110.

For example, the processor 120 includes at least one of a random access memory (RAM), a read-only memory (ROM), a main central processing unit (CPU), a first to nth interfaces, and a bus. The RAM, the ROM, the main CPU, the first to nth interfaces, or the like, may be interconnected through the bus. The ROM stores one or more instructions for booting the system and the like. When the turn-on instruction is input and power is supplied, the CPU copies the OS stored in the memory 110 to the RAM according to the stored one or more instructions in the ROM, and executes the OS to boot the system. When the booting is completed, the CPU copies various application programs stored in the memory 110 to the RAM, executes the application program copied to the RAM, and performs various operations. The main CPU accesses the memory 110 and performs booting using an operating system (OS) stored in the memory 110, and performs various operations using various programs, contents data, or the like, stored in the memory 110. The first to nth interface are connected to the various elements described above. One of the interfaces may be a network interface connected to an external device through the network.

The processor 120 may identify one of a plurality of exit points included in the neural network based on constraints on at least one of the processing or electronic apparatus 100, and process the input data via the neural network to obtain processing results output from the identified exit point as output data. For example, the processor 120 may identify one of a plurality of classifiers included in the neural network based on constraints on at least one of the processing or electronic apparatus 100.

The processor 120 may identify one of the plurality of exit points based on at least one of the time taken to reach each exit point and an accuracy. For example, the memory 110 may store computation time information for each layer of the neural network, and the processor 120 may identify the exit point based on the stored information and time constraints.

The processor 120 may identify one of a plurality of output points based on information about at least one of computational load of the electronic apparatus 100, memory capacity of the electronic apparatus 100, or power consumption of the electronic apparatus 100.

The processor 120 may obtain the processing result as output data if the confidence of the processing result is greater than or equal to a predetermined confidence level. The processing result may, for example, include data output from the intermediate exit point of the neural network, and the processor 120 may not perform a computation using the remaining layers of the neural network.

The processor 120 may further process the input data via the neural network after the identified exit point if the confidence of the processing result is below a predetermined confidence level.

If a user command to select a low-latency mode is received, the processor 120 may identify one of the plurality of exit points based on a time constraint corresponding to the low-latency mode.

The processor 120 may identify one of the plurality of exit points based on a confidence level corresponding to the confidence-based mode when a user command to select a confidence-based mode is received.

The processor 120 may further process the input data via the neural network after the identified exit point if additional processing instructions for the processing result are received, and obtain the further processed result from the neural network as output data.

The processor 120, on the other hand, may calibrate the neural network based on at least one of the processing capacity of the electronic apparatus 100, the memory 110 of the electronic apparatus 100, or the power capacity of the electronic apparatus 100.

For example, the processor 120 may calibrate the neural network in a manner that reduces the number of classes used to process the input data and output the processing result.

The processor 120 may divide the neural network into a first portion to be executed by the electronic apparatus 100 and a second portion to be executed by the remote server, and process the input data via the first portion.

If the confidence of the processing result through the first portion is above a predetermined confidence level, the processor 120 can obtain the processing result through the first portion as output data, and transmit the processing result through the first portion to the remote server if the confidence of the processing result through the first portion is less than the predetermined confidence level. The processor 120 may then receive the result of processing through the first portion from the remote server further processed through the second portion.

In addition, through the above-described operation, the processor 120 may improve accuracy while minimizing the latency of the neural network computation. Further, the processor 120 may perform additional operations if it is identified that the confidence of the processing result is insufficient. In particular, since the structure of the neural network is a cascade structure, more efficient processing is possible in that processing results can be continuously processed through the remaining layers of the neural network.

Figure 1B:
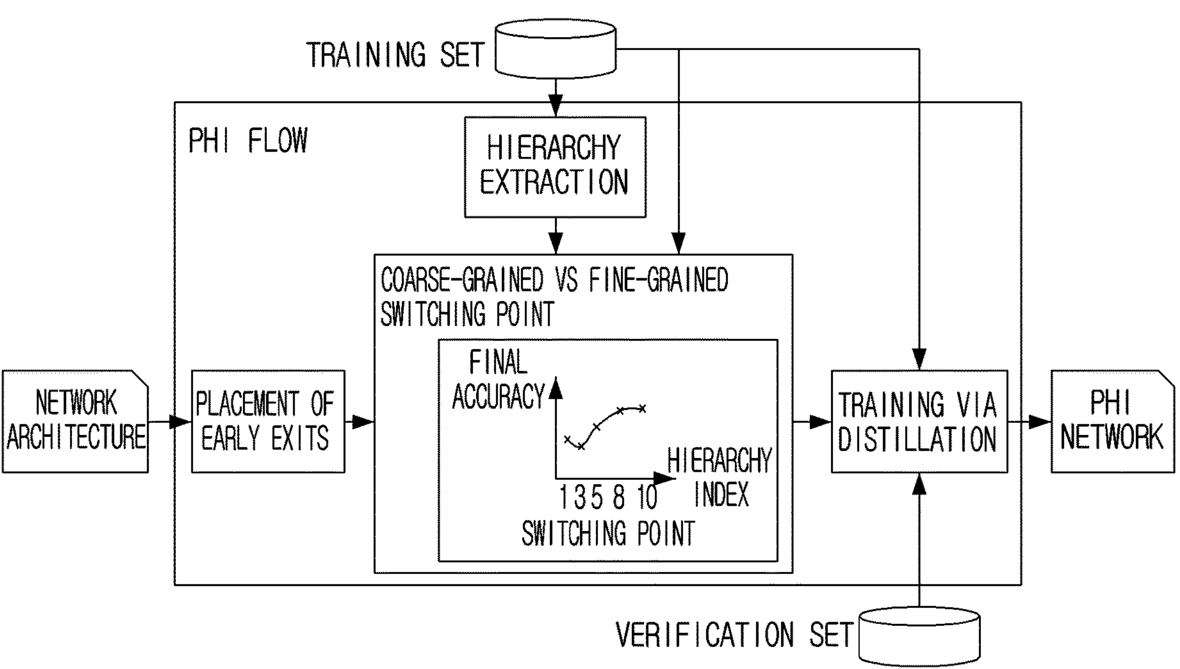
FIG. 1B is a diagram illustrating an example neural network designed according to an embodiment of the present disclosure.

FIG. 1B is a diagram illustrating an example of designing a neural network according to an embodiment of the disclosure. The present disclosure may address the existing limitations of progressive inference architectures by, for example, (i) exploiting the hierarchical structure of the target domain together with (ii) a distillation-based training procedure. Embodiments of the present disclosure may include 1) a hierarchy exploitation method, 2) a placement of early exits along the network in consideration of latency and accuracy and 3) a novel training scheme for jointly training all classifiers via knowledge distillation.

Exploiting hierarchy. To alleviate the typical low confidence of early-exit classifiers, which can lead to easy to process inputs propagating through the network with an unnecessary overhead, embodiments of the present disclosure may employ classifiers (or early exits/exit points) that operate on a coarser-grained domain. Human understanding of the world is hierarchical. For example, humans understand that “poodle” belongs to the class of “dog”, and “dog” belongs to the class of “animals”, or that “cheese” belongs to the class of “dairy”, and “dairy” belongs to the class of “food”. Embodiments of the present disclosure may incorporate this hierarchy information to the classification models of the neural network to get progressively more precise results during inference the further into the neural network you go. As mentioned above, a neural network may be divided into at least two domains, such as a coarse-grained domain and a fine-grained domain. Classifiers of the coarse-grained domain output results which are coarser (e g “animal” or “dog”) than those output by classifiers of the fine-grained domain (e.g. “poodle”). That is, classifiers may be hierarchical, where classifiers nearer the start of a neural network classify images into coarse classes using basic features extracted from an image, while classifiers that are deeper in the neural network perform finer discrimination. In such a setup, a network with N classifiers (e.g., N−1 intermediate, plus the final output) may include Ncoarse followed by Nfine exits, each one generating predictions in the corresponding domain (where N=Ncoarse+Nfine). Following this approach, coarse-grained early exits may produce predictions with higher confidence than their fine-grained counterparts, leading to lower latency for easy-to-classify samples. Moreover, the hierarchy-aware design of the network enables the support of large-scale problems with thousands of classes by allowing for more than two granularity domains. The hierarchy of the network may be extracted/determined by a number of different techniques, such as clustering (e.g. combining together) labels or features identified by other networks. The hierarchy extraction mechanism used herein is a tunable module that is selected to suit the target task.

Placement of early exits. To set up early exits, three parameters may, for example, be used: (a) the number of early exits, (b) the placement of each exit in the network and (c) the point of switching between the coarse- and fine-grained domain. As mentioned above, the conventional techniques position the early exits based on arbitrary hand-picked layers. Embodiments of the present disclosure, on the other hand, may position exits along the network by balancing the latency it takes for an input sample to reach each exit, and/or may select the switching point between the coarse- and fine-grained domain by analyzing the impact of the switching point's position on the accuracy of the final classifier at the output of the network. Another example technique for positioning the exits is to consider the floating-point operations per second (FLOPS) required to reach each stage of a neural network, and to place the early exits accordingly. However, FLOPS may not be indicative of latency, as different devices may exhibit a different runtime to implement the same number of FLOPS.

Embodiments of the present disclosure may tweak the ratio of accuracies between the coarse-grained and fine-grained domains depending on a required accuracy goal for each domain. For example, it may be required that the final classifier in the coarse-grained domain outputs results having an 80% confidence level. This may define the location of the early exits, as well as the switching point between the domains. Typically, as a result of a high confidence level in the coarse-grained domain, the accuracy or confidence level of the classifiers of the fine-grained domain is lower—this is illustrated and described in greater detail below with reference to FIG. 6.

Joint training via distillation. After introducing multiple early exits, each output may be taken into account in the final loss function in order to jointly optimize all parts of the network. To this end, embodiments of the present disclosure may employ the weighted sum method, where the weights sum of the losses of all classifiers is optimized. To further increase the accuracy of early classifiers (e.g., early exits), embodiments of the present disclosure may employ distillation as a mechanism of transferring knowledge from the end layer to intermediate classifiers. For example, the final classifier may be used as the teacher that distills knowledge to the classifiers at the early exits. In this manner, the output of the softmax layer of the final classifier may be used as a soft target when calculating the loss of intermediate classifiers, instead of using the ground-truth labels as hard targets.

Figure 2:
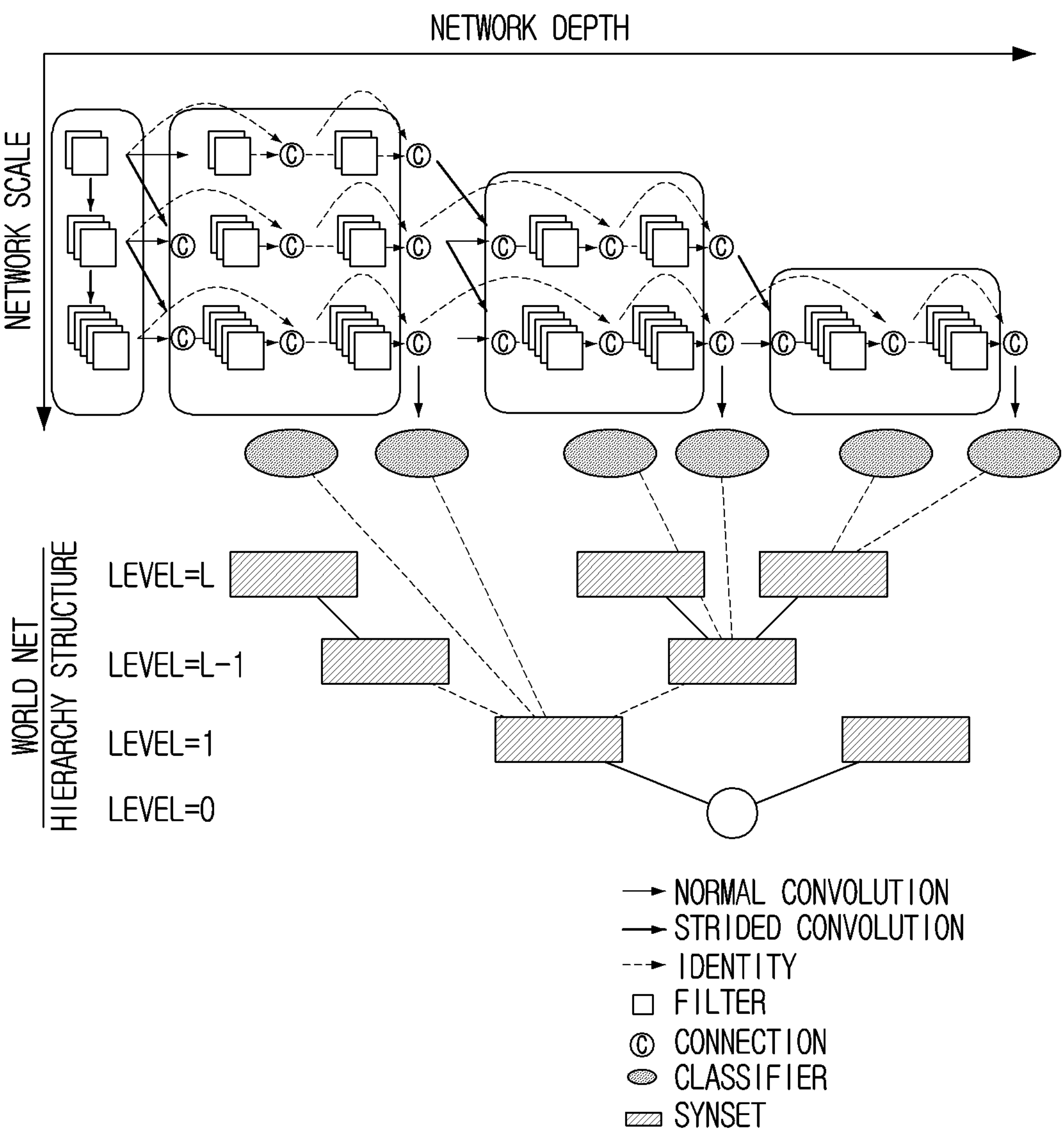
FIG. 2 is a diagram illustrating an example hierarchy-aware neural network architecture according to an embodiment of the present disclosure.

FIG. 2 is a diagram illustrating example progressive hierarchical inference according to an embodiment. As shown, there are multiple classifiers within the neural network architecture, which can be used as early exits. That is the results of these intermediate classifiers can be used to provide a processing result without having to process the input using the whole of the neural network.

Embodiments of the present disclosure could be used to select an exit point in the neural network based on a mode that an application, such as a camera application on a smartphone, may be operating in.

Figure 3:
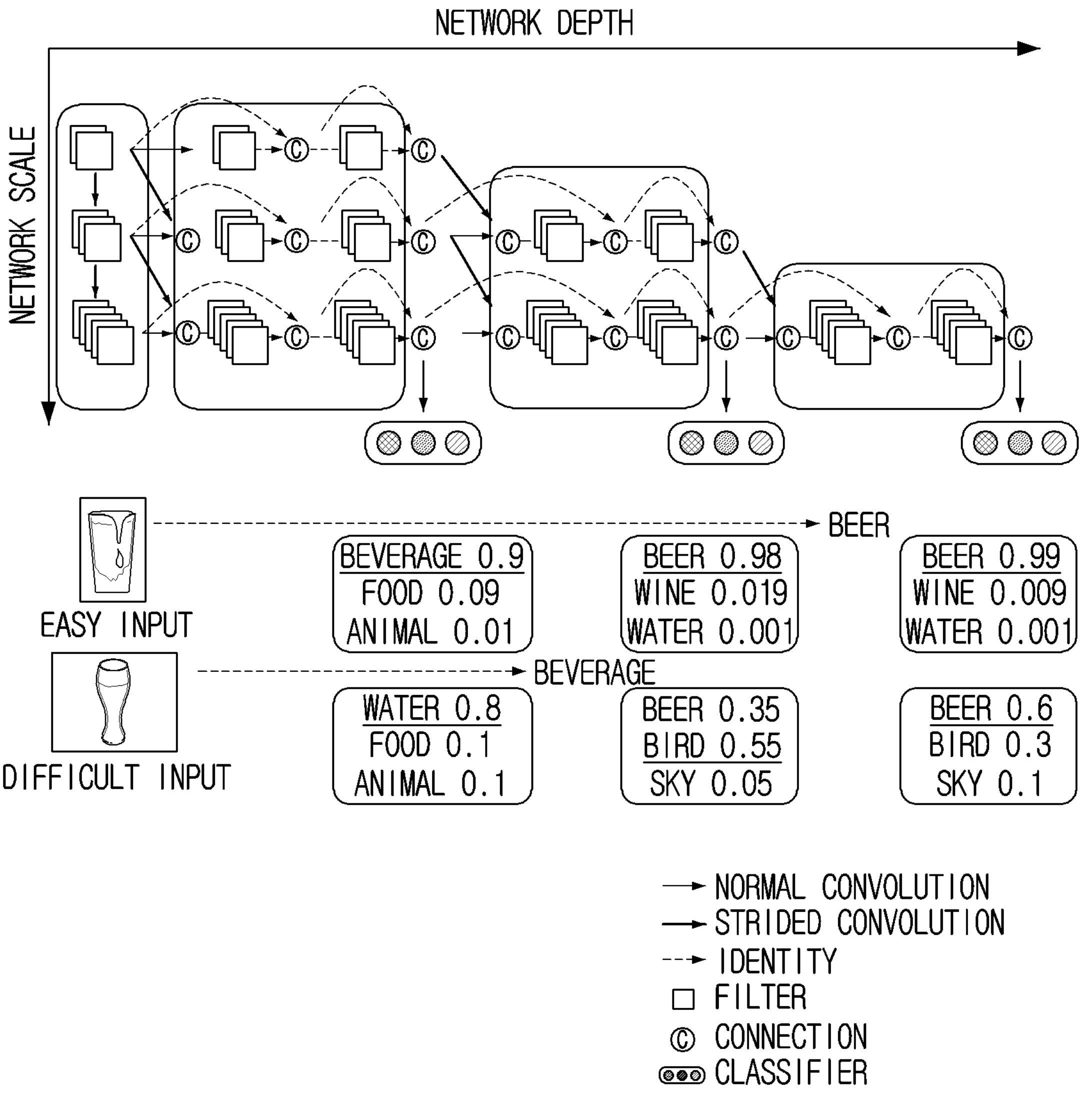
FIG. 3 is a a diagram illustrating an example confidence-based mode according to an embodiment of the present disclosure.

FIG. 3 is a diagram illustrating an example confidence-based mode according to an embodiment of the disclosure. When a confidence-based mode selection is received, selecting an exit point in the neural network may comprise selecting the first exit point which provides a processing result with a confidence level specified by the confidence-based mode. As shown in FIG. 3, for an easy input (the image showing a glass of beer), an exit point with a high confidence level may be reached early. In the illustrated example, the first exit point outputs a processing result that classifies the input image as being a drink with 90% confidence, the second exit point outputs a processing result that classifies the input image as being a beer with 98% confidence, while the third exit point classifies the input image as a beer with 99% confidence. Depending on the level of accuracy required, a processing result from the first or second exit point may be acceptable—the first exit point correctly identifies the object in the image, and the second exit point further refines the image. The third exit point provides a marginal increase in confidence of the result already obtained at the second exit point, which shows that for simple inputs, it may not be necessary to run the full neural network to obtain an acceptable result (e.g. acceptable image classification). A more difficult input (such as the image showing a glass of beer in front of a landscape containing a bird), may need to be processed more before an acceptable result is provided. As shown, the third exit point identifies the glass of beer with 60% confidence.

When execution is not restricted by latency, since the computation is incremental and dynamic, the end result can be further refined if a larger time budget is allowed. Thus, the method may further comprise: receiving a request to further refine the processing result; processing the input using at least part of a remaining portion of the neural network; and outputting a further processing result from the neural network.

Figure 4:
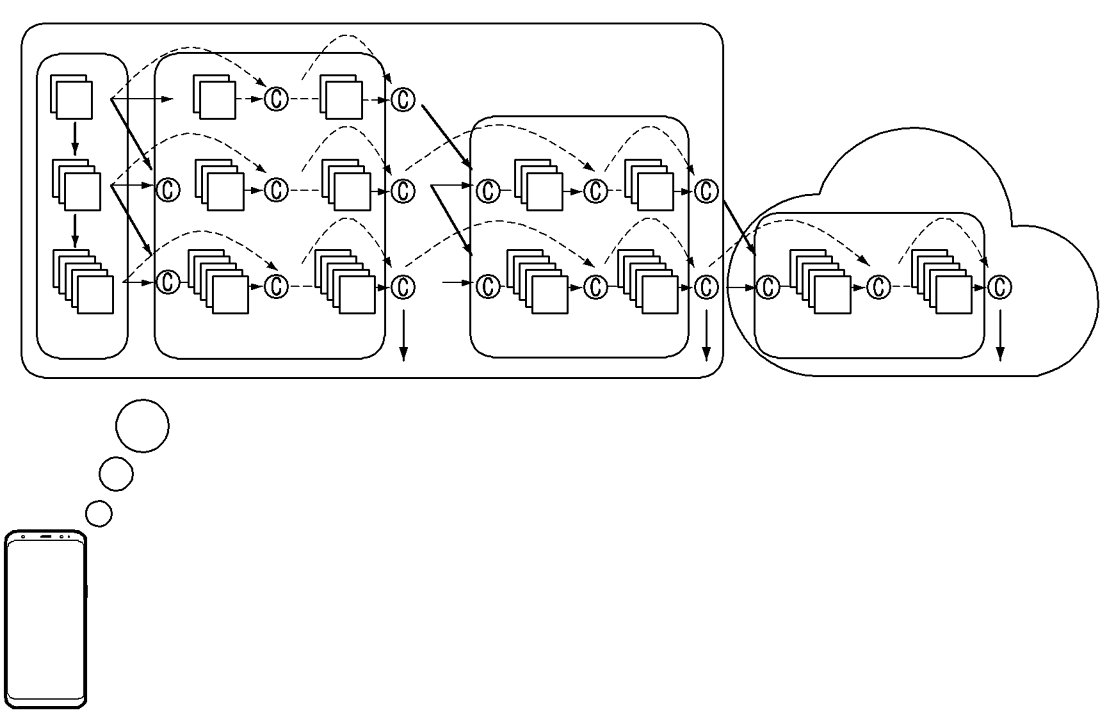
FIG. 4 is a diagram illustrating an example partitioning of a neural network across a device and a remote server according to an embodiment of the present disclosure.

FIG. 4 is a diagram illustrating example partitioning of a neural network across a device and a remote server according to an embodiment of the present disclosure. In the case of mid-tier devices (such as smartphones), the device may not have the suitable processing power to execute the whole neural network. Embodiments of the present disclosure may enable the partitioning of the neural network into a head and tail, hosted by the device and a remote server (e.g. a cloud server) respectively. Existing solutions typically employ cascade configurations, where a lightweight model is run on the device and a larger model is run on the cloud. In the existing solutions, when an input is identified as misclassified by the on-device model, it is sent to the cloud for re-computation. An advantage of embodiments of the present disclosure over the conventional approach is that the on-device computation is shared between the device and a cloud server. Thus, in the case of a misclassified input, instead of starting inference from scratch on the cloud, the output of the on-device computation is reused and refined by the cloud-hosted part of the neural network. Overall, this approach enables the acceleration of inference and hence improves the latency experienced by users of mid-tier devices.

Thus, in some cases, calibrating the neural network comprises: dividing the neural network into a first portion to be executed by the apparatus, and a second portion to be executed by a remote server; wherein processing the input using the neural network comprises processing the input using the first portion of the neural network. The method may further comprise: comparing, a confidence associated with the processing result generated using the first portion of the neural network with a required confidence; and outputting, based on the confidence associated with the processing result being greater than or equal to the required confidence, the processing result generated using the first portion of the neural network. If the confidence associated with the processing result generated using the first portion of the neural network is less than the required confidence, the method may comprise: transmitting the processing result to the remote server for further processing by the second portion of the neural network. The processing result generated by the second portion of the neural network may be output at the outputting step. If a classifier at an early exit generates a processing result that does not match or exceed a required confidence (which may be specified in a service level agreement, for example), then the processing may continue further using more of the network in order to obtain a result with a higher confidence. In cases where the network is distributed, this further processing may require using the portion of the network which has been offloaded to the remote server. For example, a classifier may identify a number of possible labels for an image, each with an associated confidence. A processing result confidence of 70% or more may be required, for example. If a classifier identifies a single label that has a confidence level of, for example, 80%, then it has the required confidence can be output at the outputting step. However, if, for example, two labels are identified by a classifier, each having a confidence level of 40%, then there are multiple possibilities for how to classify the image. In this case, the processing continues using more of the network in order to obtain a processing result with a required confidence.

It may be desirable to assess the level of accuracy a client has for a specific set of data. In this case, the method may comprise comparing the processing result generated using the first portion of the neural network (or more generally, any early exit classifier), and the final classifier of the full network. The final classifier may be considered the "oracle", such that the final label output by the final classifier is considered correct. If there is a discrepancy, or too much of a discrepancy between the processing result and the final result of the final classifier, the processing result may be considered to comprise an error in accuracy.

Figure 5:
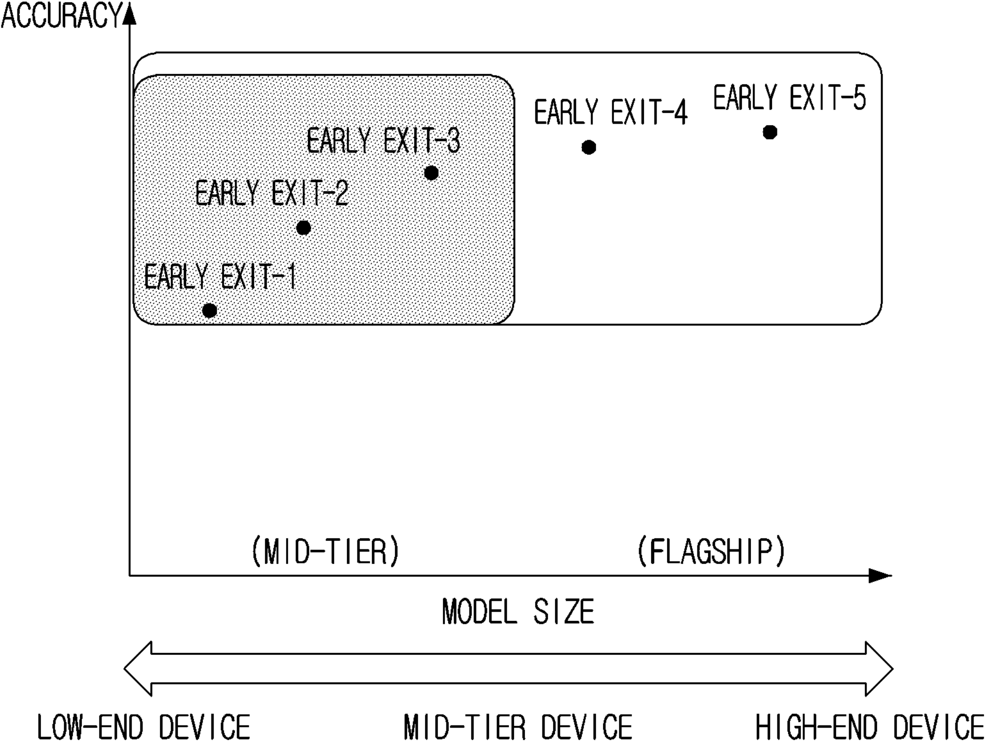
FIG. 5 is a diagram illustrating an example of enabling the neural network to be implemented on different device types according to an embodiment of the present disclosure.

FIG. 5 is a diagram illustrating an example of how to enable the neural network to be implemented on different device types according to an embodiment of the present disclosure. As mentioned above, embodiments of the present disclosure provide a neural network model that can be implemented on any type of device, as the neural network can be calibrated or tuned to suit the specifications or resources of any device. Thus, a single neural network model can be provided to a wide range of devices, where simple calibration techniques can be used to adjust the model to suit each device. Thus, the method may further comprise: receiving the neural network to be implemented on the apparatus; and calibrating the neural network based on at least one specification of the apparatus, the at least one specification comprising at least one of: a processing capacity of the apparatus, a memory of the apparatus, or a power capacity of the apparatus.

In some cases, calibrating the neural network for implementation on an apparatus may comprise reducing a number of classes used to process the input and output a processing result. By reducing the number of classes available, the number of possible outputs of the neural network is reduced, which reduces the amount of processing required and/or speeds up the processing.

Figure 6:
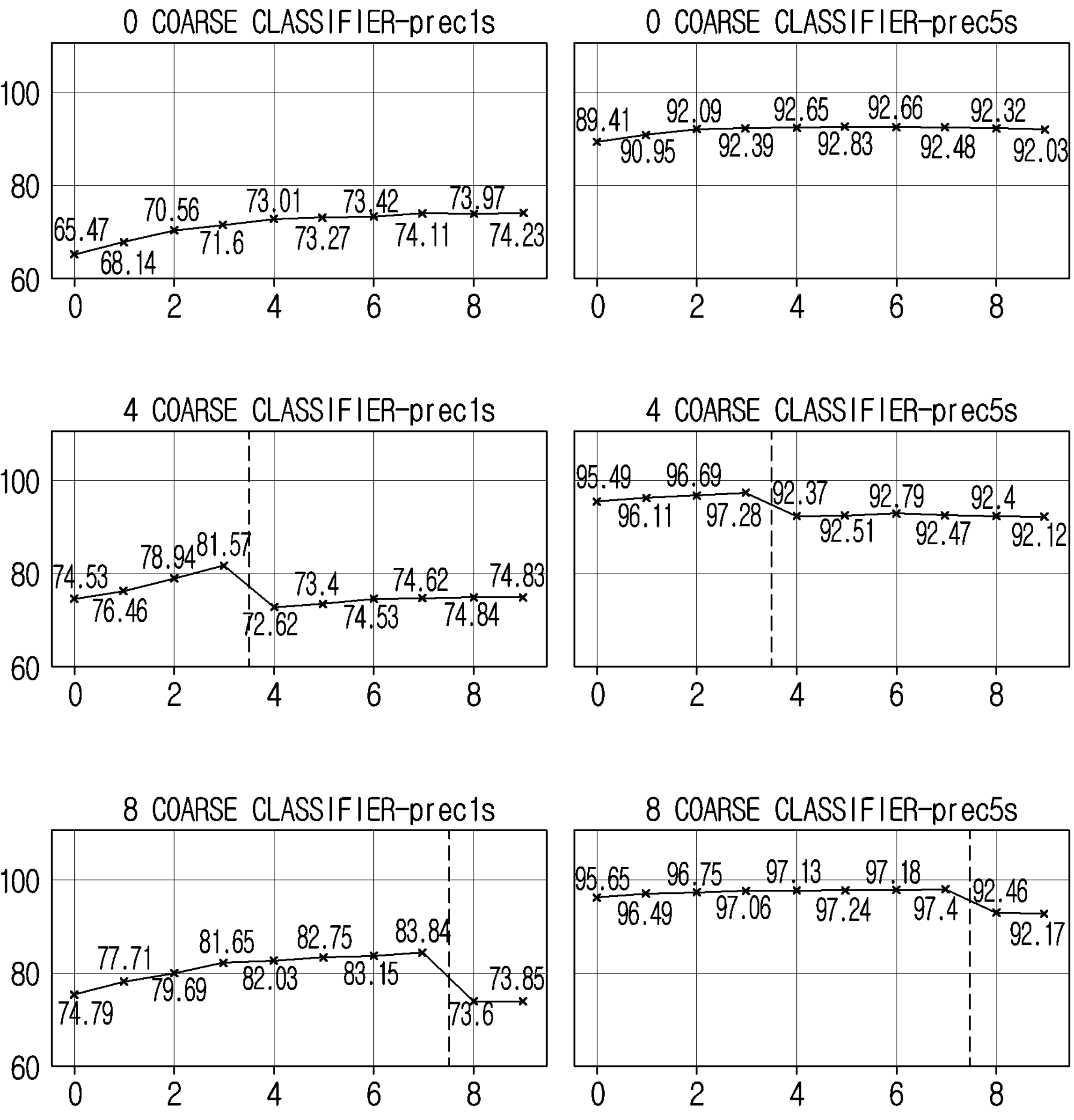
FIG. 6 is a diagram illustrating example data on the accuracy of a processing result (output) of a neural network with different numbers of coarse classifiers (exit points) according to an embodiment of the present disclosure.

FIG. 6 is a diagram illustrating example data on the accuracy of a processing result (output) of a neural network with different numbers of coarse classifiers (exit points) according to an embodiment of the present disclosure. The present techniques offer significant benefits over the evaluated baselines. Embodiments of the present disclosure were tested on MSDNet on the CIFAR-100 dataset. FIG. 6 illustrates the accuracy of embodiments of the present disclosure obtained per output with MSDNet with i) 0, ii) 4 and iii) 8 coarse classifiers. By transforming the domain to the 20 higher level classes that the CIFAR-100 dataset offers, the present disclosure can achieve significant gains in accuracy and confidence. The latter is evident in FIG. 7, which is a diagram illustrating the cumulative percentage of examples exiting at each intermediary output. In FIG. 6, the graphs on the left relate to MSDNet with 9 coarse classifiers, while the graphs on the right show a vanilla 10 block MSDNet. A calibrated threshold of 80% for early exiting was defined. The dashed lines indicate the switching point between the coarse-grained domain and the fine-grained domains. (The first two graphs have no dashed line, as they show data for a network having no coarse classifiers). It can be seen that by tweaking the ratio of accuracies between the coarse-grained and fine-grained domains depending on a required accuracy goal for each domain, the accuracy of the coarse-grained domains is higher than the accuracy of the subsequent fine-grained domains. This shows that a progressive hierarchical inference-based neural network provides results from coarse-grained domain classifiers that may have a high-enough confidence level such that it is not necessary to continue processing the input using the fine-grained classifiers. The present disclosure provides an increase of 10 percentage points in the top-1 accuracy (left hand side), and an increase in 5 percentage points in the top-5 accuracy (right hand side) when translating to the coarse domain.

Figure 7:
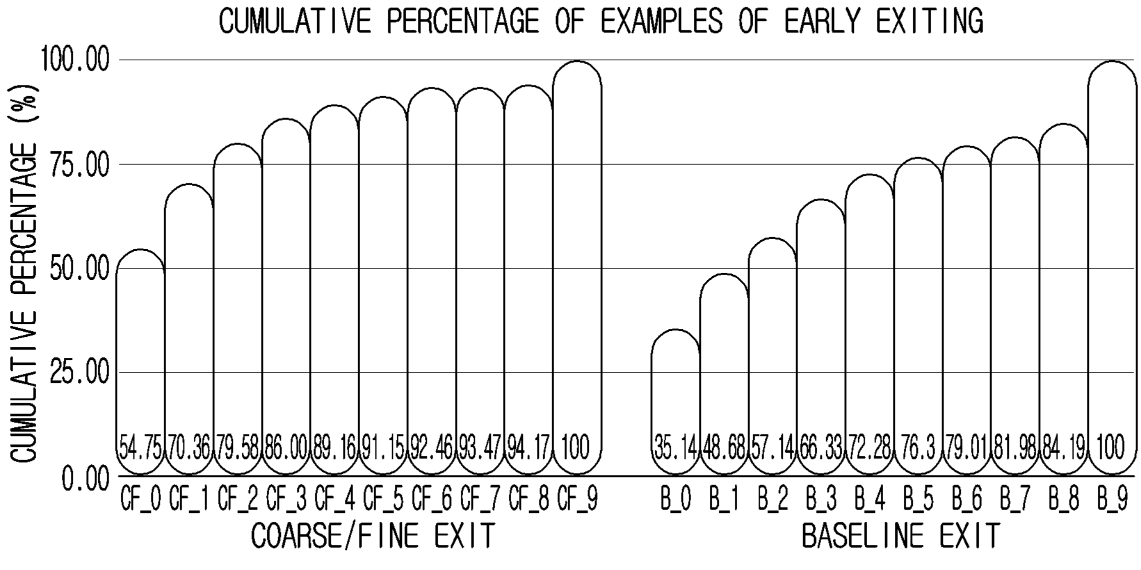
FIG. 7 is a diagram illustrating example data on the accuracy and latency of the present disclosure compared to a conventional neural network.

FIG. 7 is a diagram illustrating example data on the accuracy and latency of the present techniques (left-hand side graph) compared to a baseline (right-hand side graph), where the baseline is the same network but without the progressive hierarchical inference. It can be seen that the accuracy or confidence level of the first classifier (CF_0) of the progressive hierarchical inference based neural network of the present techniques is 54.75%, while the baseline confidence level is 35.14%. Similarly, if a confidence level of 80% is required (by a service level agreement for example), it may be possible to exit the network of the present techniques at the third classifier (CF_2), compared to much later in the standard network (see classifiers B_6 or B_7). Thus, by boosting the confidence of early-exit classifiers, processing results with the required confidence which may have previously been obtained by exiting at the 9th classifier in a neural network, are now being achieved when exiting at the 4th classifier. Thus, embodiments of the present disclosure provide a more than 2× latency reduction.

Figure 8:
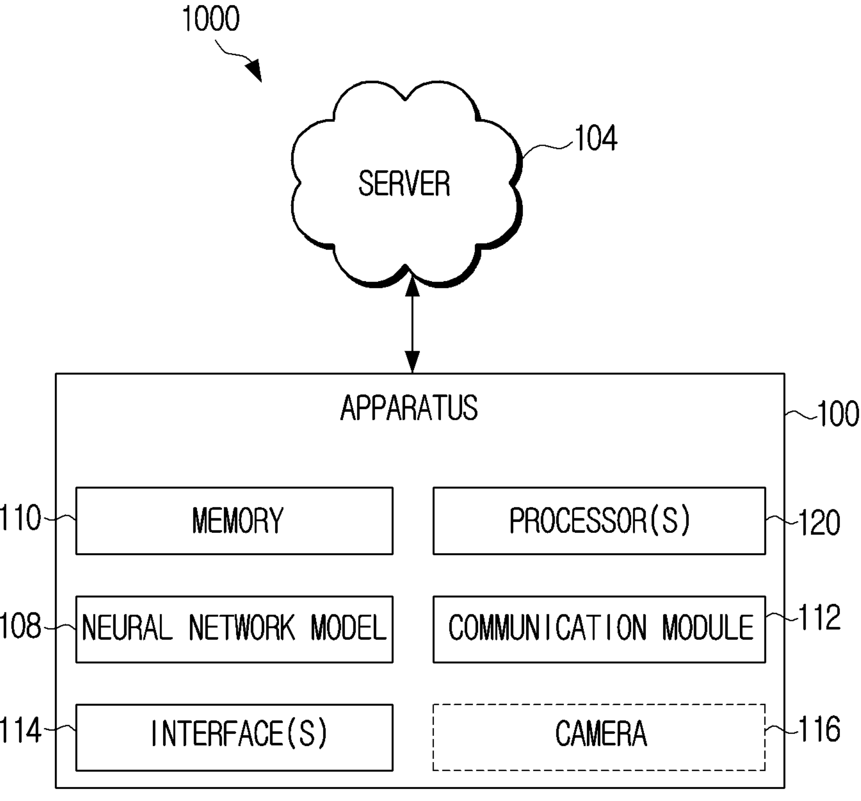
FIG. 8 is diagram of illustrating an example system according to an embodiment of the present disclosure.

FIG. 8 is a diagram illustrating an example system 1000 for implementing a variable accuracy neural network on an apparatus 100 according to an embodiment of the present disclosure. The system may include a remote server 104 (e.g. a cloud-based server) and an apparatus 100.

In some cases, the apparatus may, for example, be a high-end device or has resources that enable the apparatus to implement the neural network itself. In this case, the electronic apparatus 100 comprises at least one processor (e.g., including processing circuitry) 120 coupled to memory 110 and arranged to: receive an input to be processed by the neural network model (e.g., including processing circuitry and/or executable program elements) 108; determine at least one requirement to be satisfied when processing the input using the neural network model 108; select an exit point in the neural network model 108 based on the at least one requirement; process the input using the neural network model 108 up to the selected exit point in the neural network model 108; and output a processing result from the selected exit point in the neural network model 108.

In some cases, the apparatus may not be able to implement the neural network itself and may divide the execution of the neural network with another resource, such as the remote server 104. In this case, the electronic apparatus 100 may comprise at least one processor 120 coupled to memory 110 and arranged to: receive a neural network model 108 to be implemented on the apparatus; divide the neural network model 108 into a first portion to be executed by the electronic apparatus 100, and a second portion to be executed by the remote server 104; receive an input to be processed by the neural network model 108; determine at least one requirement to be satisfied when processing the input using the neural network model 108; select an exit point in a first portion of the neural network model 108 based on the at least one requirement; process the input using the first portion of the neural network model 108 up to the selected exit point in the first portion of the neural network 108; and output a processing result from the selected exit point in the first portion of the neural network model 108. In this case, the electronic apparatus 100 may receive a message indicating that the processing result output using the first portion of the neural network 108 comprises an error. In this case, the at least one processor 120 may transmit the processing result to the remote server 104 for further processing by the second portion of the neural network 108.

The apparatus may comprise an image capture device (e.g., a camera) 116. The apparatus may, for example, and without limitation, be any one of: a smartphone, tablet, laptop, computer or computing device, virtual assistant device, a vehicle, a drone, an autonomous vehicle, a robot or robotic device, image capture system or device, an augmented reality system or device, a virtual reality system or device, a gaming system, an Internet of Things device, a smart consumer device, or the like. It will be understood that this is a non-exhaustive and non-limiting list of example devices.

The electronic apparatus 100 may include a communication module (e.g., including communication circuitry) 112 to enable the electronic apparatus 100 to communicate with other devices/machines/components of the system 1000, and to, for example, receive inputs for processing by the neural network 108. The communication module 112 may include various communication circuitry and may be any communication module suitable for sending and receiving data. The communication module may communicate with other machines in system 1000 using any one or more of: wireless communication (e.g. WiFi), hypertext transfer protocol (HTTP), message queuing telemetry transport (MQTT), a wireless mobile telecommunication protocol, short range communication such as radio frequency communication (RFID) or near field communication (NFC), or using the communication protocols specified by ZigBee, Thread, Bluetooth, Bluetooth LE, IPv6 over Low Power Wireless Standard (6LoWPAN), Constrained Application Protocol (CoAP), wired communication. The communication module 112 may use a wireless mobile (cellular) telecommunication protocol to communicate with machines in the system, e.g. 3G, 4G, 5G, 6G etc. The communication module 112 may communicate with machines in the system 1000 using wired communication techniques, such as via metal cables or fiber optic cables. The electronic apparatus 100 may use more than one communication technique to communicate with other components in the system 1000. It will be understood that this is a non-exhaustive list of communication techniques that the communication module 112 may use. It will also be understood that intermediary devices (such as a gateway) may be located between the electronic apparatus 100 and other components in the system 1000, to facilitate communication between the machines/components.

The electronic apparatus 100 may include a memory 110. Memory 110 may comprise a volatile memory, such as random access memory (RAM), for use as temporary memory, and/or non-volatile memory such as Flash, read only memory (ROM), or electrically erasable programmable ROM (EEPROM), for storing data, programs, or instructions, for example.

The electronic apparatus 100 may include one or more interfaces (e.g., including various interface circuitry) 114 that enable the electronic apparatus 100 to receive inputs and/or generate outputs (e.g. audio and/or visual inputs and outputs, or control commands, etc.) For example, the electronic apparatus 100 may comprise a display screen to show the results of implementing a neural network, and/or a touch input to receive inputs from a user.

The electronic apparatus 100 comprises at least one processor or processing circuitry 120. The processor 120 controls various processing operations performed by the electronic apparatus 100, such as communication with other components in system 1000, and distributing part of the computation of a machine learning/neural network model from the electronic apparatus 100 to other computing resources in system 1000 (such as the remote server 104). The processor may comprise processing logic to process data and generate output data/messages in response to the processing. The processor may include, for example, and without limitation, one or more of: a microprocessor, a microcontroller, an integrated circuit, or the like.

Figure 9:
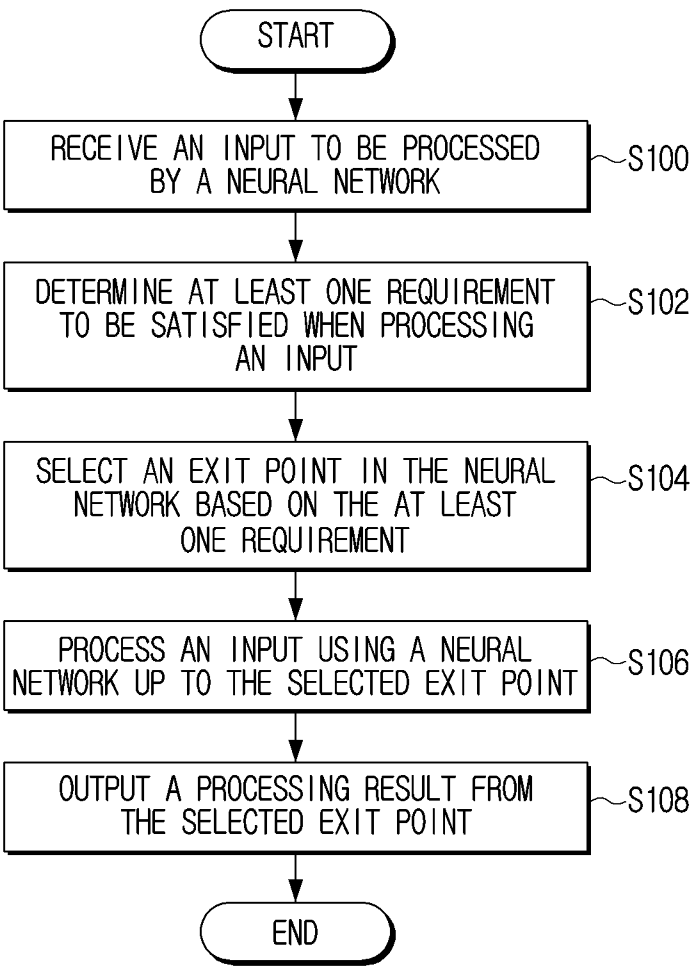
FIG. 9 is a flowchart illustrating example operations according to an embodiment of the present disclosure.

FIG. 9 is a flowchart illustrating example operations implementing a variable accuracy neural network on an apparatus according to an embodiment of the present disclosure. Once the neural network has been calibrated to suit the apparatus on which it is being implemented, the method may begin at step S100 by receiving an input to be processed by the neural network. The input could be any type of input. In an example, the input may be image frames obtained by a camera or image capture device of the apparatus before a user of the apparatus has pressed a button to capture an image. Thus, the method may be used to determine how to capture the image should a user press the button to capture the image, and/or how to process the image post-capture so that it is of a high-quality. The method may therefore be performed in the seconds or milliseconds before the user presses the button to capture the image, and therefore, latency must be avoided.

The method may comprise determining at least one requirement to be satisfied when processing the input using the neural network (step S102). The step of determining at least one requirement may comprise determining a required confidence level to be satisfied when processing the input by the neural network.

The step S102 of determining at least one requirement may include receiving a mode selection, each mode specifying at least one requirement. Receiving a mode selection may comprise receiving one of: a low-latency mode, and a confidence-based mode.

The method may include selecting an exit point in the neural network based on the at least one requirement (step S104). Selecting an exit point in the neural network may comprise selecting one of a plurality of exit points that are equidistantly-spaced through the neural network. Selecting an exit point in the neural network may comprise selecting one of a plurality of exit points that are positioned within the neural network to balance a time taken to reach each exit point and accuracy. Selecting an exit point in the neural network may comprise selecting one of a plurality of exit points that are positioned in a coarse-grained domain or in a fine-grained domain of the neural network. Selecting an exit point in the neural network may comprise selecting one of a plurality of classifiers in the neural network.

The method may further comprise: receiving information on at least one of: a computational load of the apparatus, a memory capacity of the apparatus, or power consumption of the apparatus. In this case, selecting an exit point (step S104) in the neural network may comprise selecting an exit point based on the at least one requirement and the received information.

The method may comprise processing the input using the neural network up to the selected exit point in the neural network (step S106); and outputting a processing result from the selected exit point in the neural network (step S108).

While the disclosure has been illustrated and described with reference to various example embodiments thereof, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A method for controlling an electronic apparatus, the method comprising:

receiving input data;

identifying one of a plurality of exit points included in a neural network based on a time taken to reach each exit point to provide a processing result and based on a memory capacity of the electronic apparatus, the neural network providing progressive hierarchical inference by having at least a coarse-grained domain and a fine-grained domain, and coarse-grained results output from exit points in the coarse-grained domain are further processed in the fine-grained domain to obtain fine-grained results;

processing the input data via the neural network;

obtaining processing results output from the identified exit point as output data; and using knowledge distillation, jointly training a plurality of classifiers corresponding to the plurality of exit points.

2. The method as claimed in claim 1, wherein the plurality of exit points are equidistantly spaced in the neural network.

3. The method as claimed in claim 1, wherein the identifying comprises identifying one of the plurality of exit points based on accuracy.

4. The method as claimed in claim 1, wherein:

the neural network includes the coarse-grained domain corresponding to a starting part of the neural network and the fine-grained domain corresponding to a deeper part of the neural network following the starting part;

classifiers in the coarse-grained domain generate coarser predictions then classifiers in the fine-grained domain; and a plurality of exit points are positioned in the coarse-grained domain or the fine-grained domain.

5. The method as claimed in claim 1, wherein the obtaining comprises, based on a confidence of the processing result being greater than or equal to a predetermined confidence level, obtaining the processing result as the output data.

6. The method as claimed in claim 5, further comprising:

based on the confidence of the processing result being less than the predetermined confidence level, further processing the input data through a neural network after the identified exit point.

7. The method as claimed in claim 1, further comprising:

receiving a command to select a low-latency mode, wherein the identifying comprises identifying one of the plurality of exit points based on time constraints corresponding to the low-latency mode.

8. The method as claimed in claim 1, further comprising:

receiving a command to select a confidence-based mode, wherein the identifying comprises identifying one of the plurality of exit points based on the confidence level corresponding to the confidence-based mode.

9. The method as claimed in claim 8, further comprising:

receiving an additional processing command for the processing result;

additionally processing the input data through a neural network after the identified exit point; and obtaining the additionally-processed data from the neural network as the output data.

10. The method as claimed in claim 1, further comprising:

calibrating the neural network based on at least one of a processing capacity of the electronic apparatus, the memory capacity of the electronic apparatus, or a power capacity of the electronic apparatus.

11. The method as claimed in claim 10, wherein the calibrating comprises reducing a number of classes used for processing the input data and outputting the processing result.

12. The method as claimed in claim 10 wherein the calibrating comprises partitioning the neural network into a first portion configured to be executed by the electronic apparatus and a second portion configured to be executed by a remote server, and wherein the obtaining comprises processing the input data through the first portion.

13. The method as claimed in claim 12, wherein based on a confidence of the processing result through the first portion being greater than or equal to the predetermined confidence level, the processing result through the first portion is obtained as the output data.

14. The method as claimed in claim 13, further comprising:

based on the confidence of the processing result through the first portion being less than the predetermined confidence level, transmitting the processing result through the first portion to the remote server; and receiving, from the remote server, a result obtained by additionally processing, through the second portion, the processing result through the first portion.

15. An electronic apparatus comprising:

a memory storing at least one instruction; and a processor coupled to the memory and configured to control the electronic apparatus, wherein the processor is configured to:

identify one of a plurality of exit points included in a neural network based on a time taken to reach each exit point to provide a processing result and based on a memory capacity of the electronic apparatus, the neural network providing progressive hierarchical inference by having at least a coarse-grained domain and a fine-grained domain, and coarse-grained results output from exit points in the coarse-grained domain are further processed in the fine-grained domain to obtain fine-grained results;

process the input data via the neural network;

obtain processing results output from the identified exit point as output data; and jointly train, using knowledge distillation, a plurality of classifiers corresponding to the plurality of exit points.

16. The electronic apparatus as claimed in claim 15, wherein the processor, based on a confidence of the processing result being greater than or equal to a predetermined confidence level, is configured to obtain the processing result as the output data.

17. The electronic apparatus as claimed in claim 16, wherein the processor, based on the confidence of the processing result being less than the predetermined confidence level, is configured to further process the input data through a neural network after the identified exit point.

* * * * *